(12) United States Patent
Gibson

(10) Patent No.: US 6,203,049 B1
(45) Date of Patent: Mar. 20, 2001

(54) TERRAIN FOLLOWING HITCH

(76) Inventor: David A. Gibson, Box 203, Lund, NV (US) 89317

( * ) Notice: Subject to any disclaimer, the term of this patent is extended or adjusted under 35 U.S.C. 154(b) by 0 days.

(21) Appl. No.: 09/186,978

(22) Filed: Nov. 5, 1998

(51) Int. Cl.[7] ............................................. B60D 13/00
(52) U.S. Cl. ............................................................ 280/494
(58) Field of Search ................................... 280/492, 494, 280/515

(56) References Cited

U.S. PATENT DOCUMENTS

| | | | |
|---|---|---|---|
| 2,612,826 | 10/1952 | Williams | 172/680 |
| 3,368,828 | 2/1968 | Engler | 280/489 |
| 3,905,619 | * 9/1975 | Sylvester | 280/494 |
| 3,923,322 | 12/1975 | Hancock | 280/461.1 |
| 4,440,415 | 4/1984 | Wykhuis et al. | 172/680 |
| 4,641,852 | 2/1987 | Kerst et al. | 280/489 |
| 4,711,461 | * 12/1987 | Fromberg | 280/494 |
| 5,186,483 | * 2/1993 | Sheppard | 280/494 |
| 5,360,070 | 11/1994 | Milton | 172/6 |
| 5,394,948 | 3/1995 | Bunnell | 280/515 |
| 5,531,283 | * 7/1996 | Austin et al. | 280/494 |
| 5,706,901 | * 1/1998 | Walters et al. | 280/494 |
| 5,810,371 | * 9/1998 | Velke | 280/492 |

* cited by examiner

Primary Examiner—Brian L. Johnson
Assistant Examiner—Matthew Luby
(74) Attorney, Agent, or Firm—Robert L. Shaver; Frank J. Dykas

(57) ABSTRACT

A terrain following hitch which mounts on a tractor draw bar by a pin, and which allows an implement being towed to move in three planes, independent of the tractor. The hitch includes three hinges, and a draw bar attachment tube which fits over the draw bar of a tractor, and transmits force to the walls of the draw bar, instead of into the pin and pin holes. The hitch reduces wear on implements and hitch connections.

10 Claims, 4 Drawing Sheets

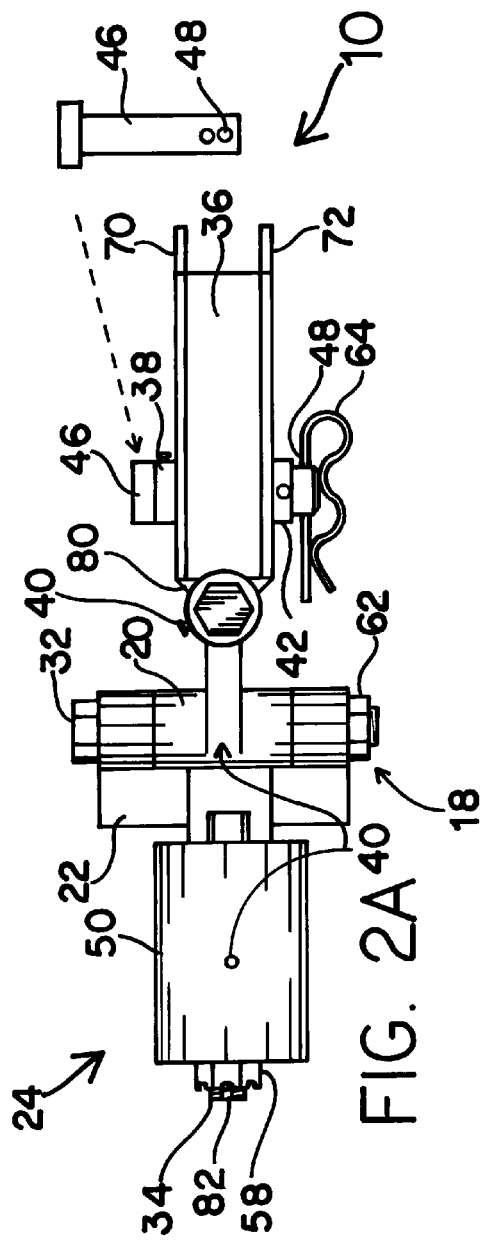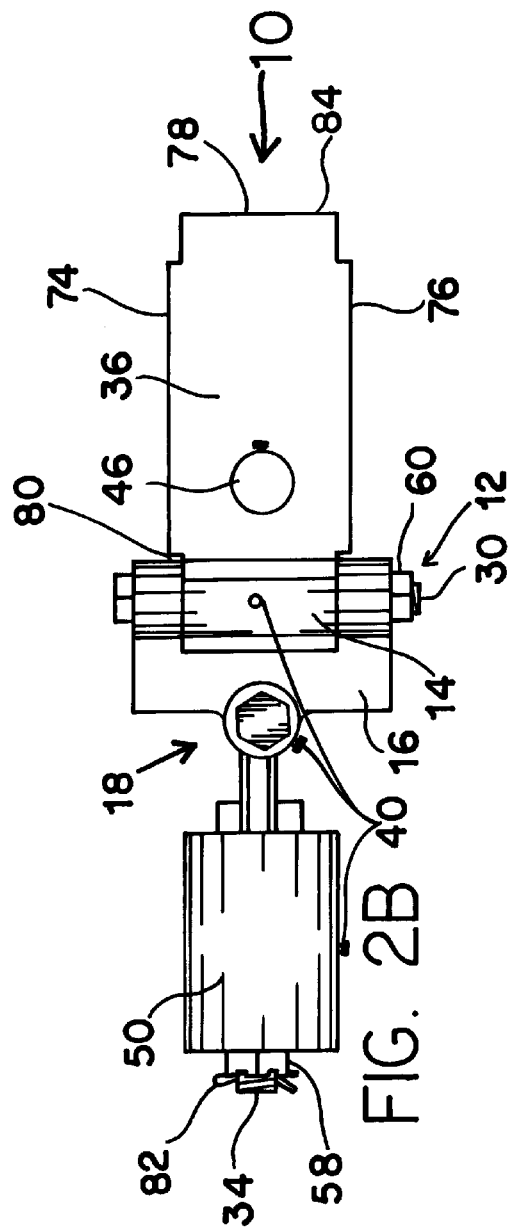

TERRAIN FOLLOWING HITCH

BACKGROUND OF THE INVENTION

1. Field of the Invention

The present invention generally relates to devices for attaching towed loads to vehicles, and more particularly to implement connection devices which allow an implement to move independently of the position and orientation of the towing vehicle.

2. Background Information

The typical manner in which farming implements are attached to a tractor is by the use of a solid draw bar which is rectangular in cross-section. The draw bar has a hole in it through which a pin is placed which holds an implement in connection with the draw bar and the tractor. The implement typically has a rectangular piece with a hole in it through which the pin is inserted, or it may have two rectangular pieces, each with a corresponding hole, which are oriented with one bar directly above another bar. In this configuration, the draw bar of the tractor slips between the two attachment plates of the implement, and the pin goes through all three holes.

The problem with this arrangement of attaching an implement to a tractor is that this type of connection is either built with a lot of slop between the parts, or it develops slop as the parts wear against each other. When an implement connected by the typical connection is pulled behind a tractor, for instance, the tractor pulls it forward with great force. The force is transmitted from the tractor to the pin which holds the implement to the draw bar. The implement also can be resisting movement with great force, as plows, discs, scrapers or other implements work the earth behind the tractor. This results in great force being applied to the pin hole in the draw bar, to the pin, and the pin hole in the implement attachment bars. The holes get larger and larger, and the pin gets smaller and smaller. After a period of time, even in normal unstressed travel, such as on a paved road, the slop in the fit between the locking pin and the pin holes causes the implement to bounce back and forth and to further enlarge the pin holes and to further wear down the pin. This jarring and bouncing back and forth also causes damage to the implement itself.

Sometimes the amount of play or slop in the connection is intentional, and is built in to allow the implement to move in a plane different than the tractor. For instance, when the tractor is on level ground, but the implement is on a side hill, the connection must have enough play or flex to allow the implement to twist in relation to the tractor, or the connecting parts would bend or break.

Some manufacturers of implements have tried to address the problem of too much play by placing two pin holes in the draw bar, and using bolts with washers and nuts to secure the implement to the draw bar, instead of using a drop-in pin. This approach greatly improves the wear and tear on all parts of the system, but it is slow and awkward to attach an implement in this way, and requires the use of tools.

Accordingly, it is an object of the invention to provide a system by which a farm implement or another towed object can be attached to a tractor, or another towing vehicle, in a manner which does not allow the pin hole or the pin of the connection to develop excessive slop through wear.

It is another object of the invention to provide a connection between a towed object and a towing vehicle which allows the towed object to orient itself according to the terrain it is traveling over, and independent of the orientation of the vehicle towing it. It is a further object that this connection system does not require the use of tools to make the connection.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

These and other objects and advantages are attained by the terrain following hitch of the invention. The terrain following hitch of the invention is a device for attaching a towed vehicle or object to a towing vehicle. The towed vehicle or object could include farm vehicles, a trailer pulled by a tractor trailer rig, a trailer pulled by a vehicle, an earth moving implement pulled by a large earth moving vehicle, or any kind of towed vehicle or object which is attached to a towing vehicle. In the situation of a tractor and a farm implement, a draw bar of the tractor is utilized to attach the farm implement to the tractor. The equivalent of the draw bar of a tractor is present in other towing situations in the form of a trailer hitch, or other connections for attaching the tongue of the towed vehicle or object to the towing vehicle. The invention includes a means of attaching the terrain following hitch to the draw bar. In the example of a tractor towing a farm implement, this can be a hole in the draw bar through which a locking pin is inserted.

The terrain following hitch also includes a first hinge, composed of two hinge leaves, and a hinge pin. The hinge allows the implement or towed object to rotate within a first plane. The first hinge is attached to the draw bar by the means of attachment, and it is also attached to a second hinge. The second hinge also has two leaves, and a second hinge pin. The second hinge allows the rotation of the towed vehicle or object within a second plane, which is at 90° to the first plane. The second hinge is attached to the first hinge and to a third hinge. The third hinge has at least one third leaf, and a third hinge pin. The third hinge allows rotation of the towed vehicle or object within a third plane, which is at a 90° angle to the first and second plane. The third hinge is attached to the second hinge utilizing the third hinge pin to attach to the second hinge. This configuration using three hinges in the terrain following hitch allows the towed vehicle or object to rotate in three planes and seek a position which conforms to the configuration of the ground over which it is traveling, and independent of the position of the towed vehicle.

In one configuration of the terrain following hitch, the third hinge is constructed so that the third hinge pin is attached to a leaf of the second hinge. On the third hinge pin is mounted a third leaf, which is a tubular and generally cylindrical component, which surrounds the third hinge pin. An implement, towed vehicle, or object is connected to the third leaf of the third hinge. The tubular leaf is able to rotate around the third hinge pin, and allows the towed vehicle or object to also rotate around the third hinge pin.

The terrain following hitch can utilize a means of attachment to the draw bar which is a draw bar attachment tube. The draw bar attachment tube has at least one hole, but can have more than one hole for the passage of a locking pin. The draw bar attachment tube mounts over the draw bar and receives the locking pin which also passes through the pin hole of the draw bar, and the pin hole of the draw bar attachment tube. In one configuration, the draw bar attachment tube is rectangular in cross section, and closely fits the cross-sectional configuration of the draw bar. It has two pairs of opposing sides, with a pin hole in each of two of those opposing sides. These pin holes are configured to align with the corresponding pin hole in the draw bar, so that when the draw bar is fully inserted into the draw bar attachment tube, the three holes line up, and the pin can be dropped into place without the use of tools. Although the locking pin is placed in position without the use of tools, the draw bar attachment tube fits snugly around the draw bar, and over a considerable length of the draw bar so that a single pin results in a firm connection of the draw bar attachment tube to the draw bar, with very little play or slop. Any lateral forces between the towing vehicle and the towed object, vehicle or implement, is primarily directed to the four sides of the draw bar, rather than to the locking pin. The draw bar attachment tube can further comprise a bushing surrounding each pin hole in the draw bar attachment tube sides.

The terrain following hitch can be configured so that the first hinge is orientated vertically, the second hinge is orientated horizontally, normal or perpendicular to the direction of travel of the towing vehicle, and the third hinge or spindle is also orientated horizontally, with the third hinge pin or the spindle parallel to the direction of travel of the towing vehicle or tractor. The terrain following hitch can also be configured so that the first hinge is orientated horizontally, with the hinge pin normal or perpendicular to the direction of travel of the towing vehicle or tractor, and the second hinge oriented vertically.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

BRIEF DESCRIPTION OF THE DRAWINGS

FIG. 2A is a top view of a first preferred embodiment of the terrain following hitch.

FIG. 2B is a side view of a first preferred embodiment of the terrain following hitch.

DESCRIPTION OF THE PREFERRED EMBODIMENTS

Figure 1:
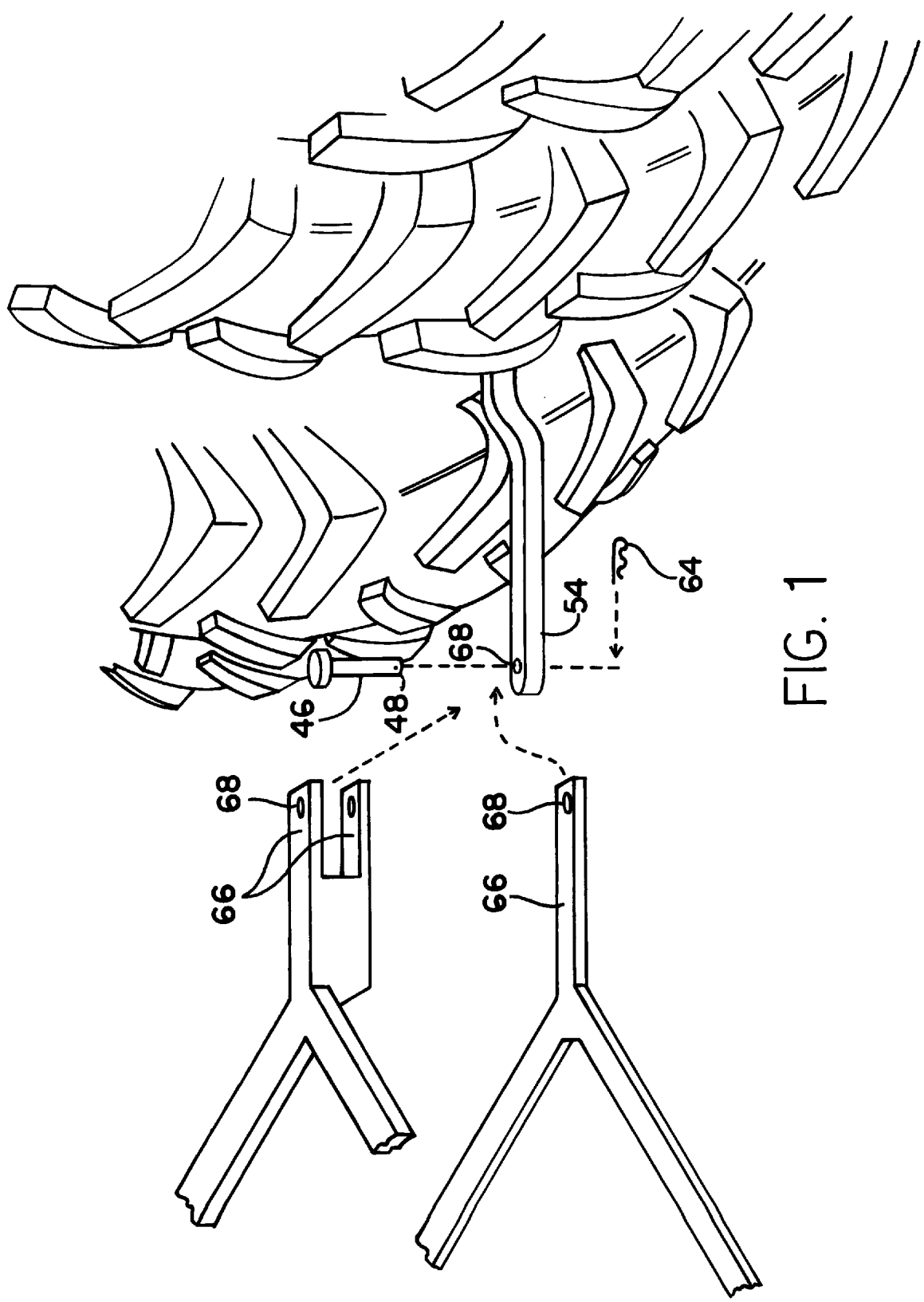
FIG. 1 is a perspective view of prior art attachment systems.

Two of the preferred embodiments of the invention are shown in the FIGS., 2A through 4D. FIG. 1 is a perspective view of a prior art implement attachment system, showing a draw bar 54, a locking pin 46 with a key way 48, and prior art draw bar attachment plates 66, each with a pin hole 68 for the passage of the pin 46. Also shown is cotter pin 64. This system of engagement was provided with enough tolerance, also called play or slop, in the connections so that the implement could move up and down, and side to side, in relation to the tractor 52 to a certain degree, without bending any of the pieces. It could also twist to a certain degree so that the wheels of the towed object or vehicle or implement could be one higher than another, while the wheels of the tractor remain level with each other. Having loose tolerances to allow this kind of motion gives enough play to the parts so that as an implement is being pulled by the tractor, it can bounce back and forth and side to side against the locking pin 46. This transmits vibrations of impact to the implement pin 56, and causes it to wear out faster, and causes wear on the locking pin 46 and the pin holes 68, and all of the pieces. Additionally, there may not be enough slack in the system to accommodate severe orientation differences between the tractor 52 and the implement 56.

Figure 3:
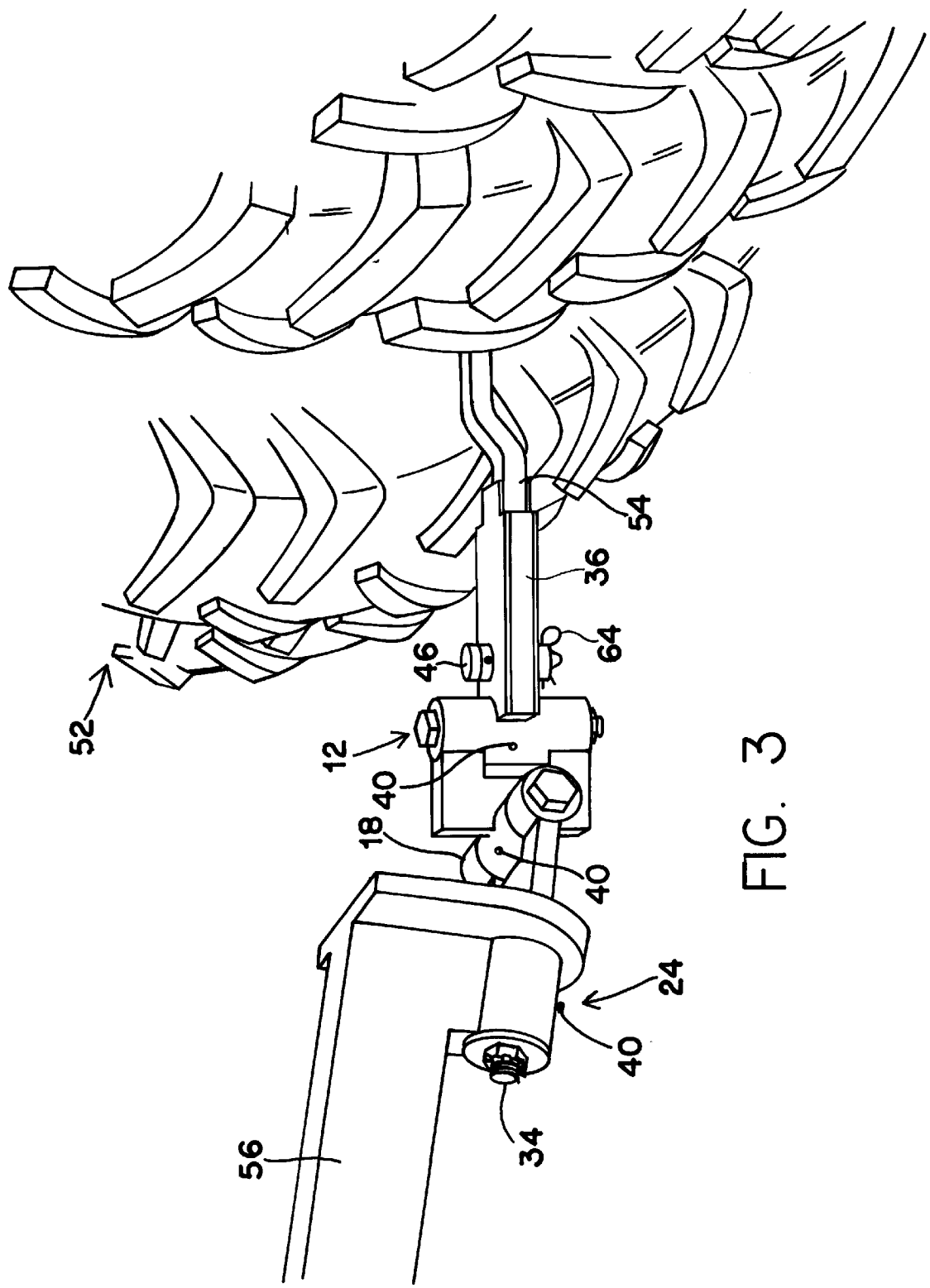
FIG. 3 is a perspective view of a second preferred embodiment of the terrain following hitch.

One version of the terrain following hitch 10 of the invention is shown in top view in FIG. 2A and side view in FIG. 2B. A second preferred version is also shown in FIG. 3. The terrain following hitch 10 includes a draw bar attachment tube 36, which is rectangular in cross-section and has a top side 70, a bottom side 72, a left side 74, and a right side 76. Adjacent to side 20 is an alignment tab 84. In the preferred embodiment, the draw bar attachment tube 36 is approximately 10 inches long, with inside dimensions of 3 inches wide×1½ inches tall. The walls 70 through 76 are made of steel, with a wall thickness of ½ inches. The draw bar attachment tube 36 has a tractor end 78 and an implement end 80. Near the implement end 80 are mounted a top bushing 38 and a bottom bushing 42, which are cylindrical projections from the draw bar attachment tube 36.

An alternative embodiment of the device uses a receiver hitch insertion tube instead of the draw bar attachment tube. This is a tube or solid square bar which fits in a standard receiver hitch of a truck or vehicle.

Attached to the draw bar attachment tube 36 at the implement end 80 is the static leaf 14 of first hinge 12. Mounted around static leaf 14 is rotating leaf 16 of the first hinge 12. The two are joined together by a hinge pin 30, which is secured by a hinge nut 60. Static leaf 14 is generally cylindrical, with an inside diameter of 1¼ inches and an outside diameter of 2¼ inches. Rotating leaf 16 is made from steel plate and has a thickness of 1 inches, and is approximately 3 inches wide×8 inches long. Welded to rotating leaf 16 is second hinge 18. The second static leaf 20 of second hinge 18 is welded to the rotating leaf 16 of the first hinge 12. The second hinge 18 is identical in configuration to the first hinge 12. The second hinge 18 includes a second hinge pin 3. On the second rotating leaf 22 of the second hinge 18 is welded a generally cylindrical piece which is the third hinge pin 34, also called a spindle. One end of the third hinge pin 34 is threaded, and has a castle nut 58 threaded on to this end of the third hinge pin 34, secured by a cotter key 82. Mounted on the third hinge pin 34 is a tool tube 50, which acts as the third rotating leaf of the third hinge 24. An implement is typically attached to tool tube 50, as shown in FIG. 3. The assembled device is shown in FIG. 3 attached to a draw bar 54 of a tractor 52 and connecting an implement 56 to the tractor 52. FIG. 3 shows a configuration of the device in which first hinge 12 is oriented vertically, second hinge 18 is oriented horizontally, normal or perpendicular to the direction of travel, which is parallel to the draw bar 54.

The third hinge pin 34 is parallel to the direction of travel. The first hinge 12 allows the implement to move from side to side, or in a first or horizontal plane in relation to the tractor. The second hinge 18 allows the implement 56 to move up and down in a second or vertical plane in relation to the tractor 52. Third hinge 24 allows the implement to rotate around an axis parallel to the direction of travel. Two or more of the hinges can act at the same time, allowing varying orientations of the implement in relation to the tractor.

FIGS. 2A and 2B show one configuration of the terrain following hitch in which the first hinge 12 is oriented horizontally and normal to the direction of travel. Second hinge 18 is oriented vertically, and the third hinge pin 34 and the third hinge 24 is oriented so that the third hinge pin 34 is parallel to the direction of travel.

The terrain following hitch 10 is utilized by attaching an implement 56 to the tool tube 50. This is preferably by welding. Once the implement 56 is connected to the tool tube 50, the tractor 52 is backed up until the draw bar 54 enters the draw bar attachment tube 36, and touches the implement end 80 of the draw bar attachment tube 36. In this position, locking pin 46 can be dropped into place through the pin hole 68 of the draw bar attachment tube 36, and through the pin hole 68 of the draw bar 54. The locking pin 56 extends through the top side 70 and the bottom side 72 of the draw bar attachment tube 36 and a key 64 is inserted through the key hole 48 of locking pin 46 to secure the locking pin in place.

In the preferred embodiment, a lubrication fitting 40 is mounted on static leaf 14, $2^{nd}$ static leaf 20, and tool tube 50. Lubricants, such as grease, may be injected into lubrication fitting 40.

Figure 4A:
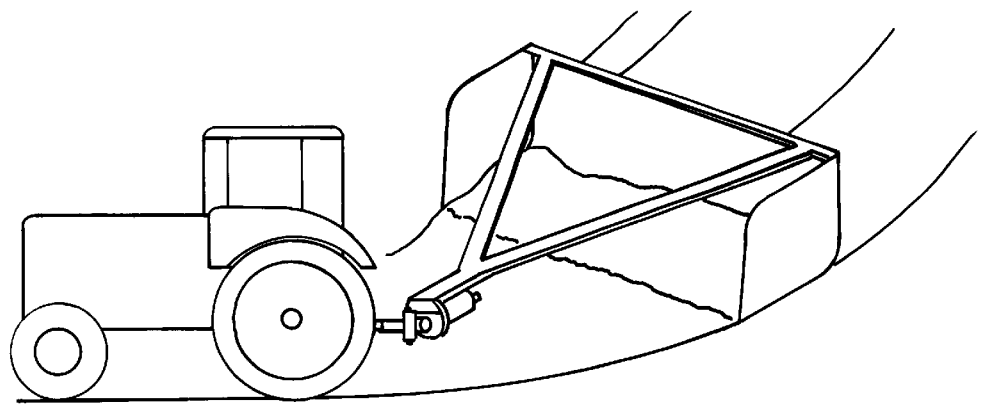
FIG. 4A is a view of the terrain following hitch in which the implement is at an angle from the tractor.
Figure 4B:
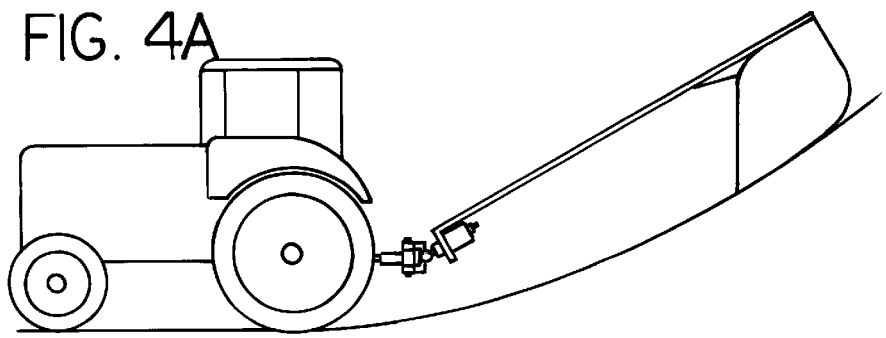
FIG. 4B is a side view of the terrain following hitch in which the implement is higher than the tractor.
Figure 4C:
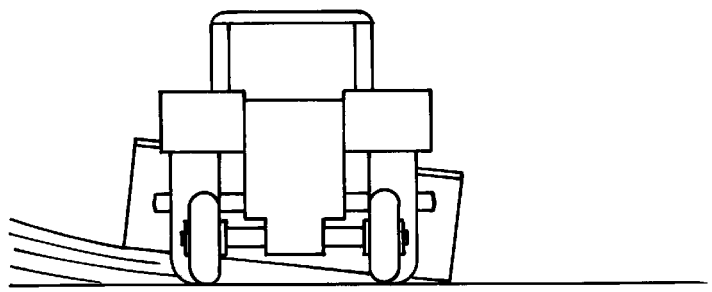
FIG. 4C is a front view of a tractor and implement in which the implement is at a different angle than the tractor.
Figure 4D:
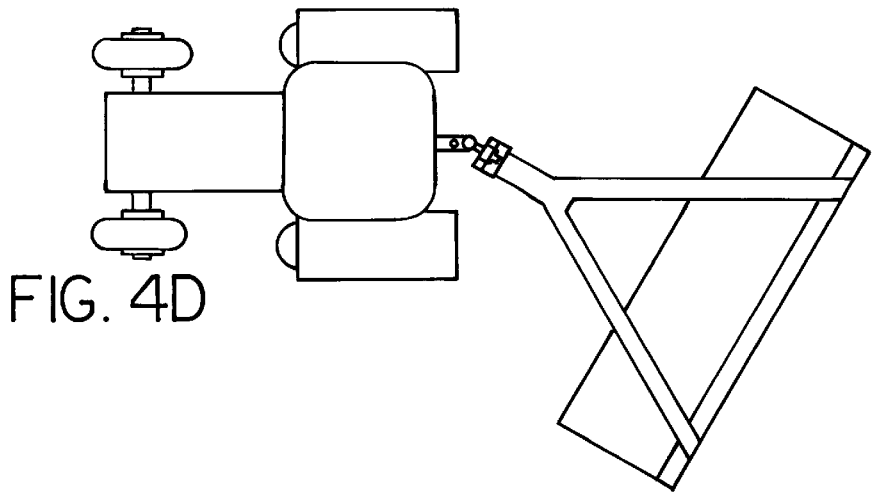
FIG. 4D is a top view of an implement and tractor in which the implement is rotated to one side of the direction of travel of the tractor.

Once thus mounted, a tractor 52 can pull an implement 56 over the ground or on the pavement. If on uneven ground, the implement can be different in elevation and have a different in side-to-side orientation from the tractor 52, as shown in FIG. 4A. The implement 56 can also be higher or lower than the tractor 52, as shown in FIG. 4B. The implement 56 can be on a different horizontal orientation than the tractor 52, as shown in FIG. 4C. The implement 56 can also rotate from side to side from the tractor 52, as shown in FIG. 4D, which is a typical configuration when turning.

Although illustrated with a tractor 52 and an implement 56, the terrain following hitch 10 could be equally suitable for other towed vehicles or objects, and other towing vehicles. This could include trailers being towed by a tractor trailer rig, trailers being towed by pickups or passenger vehicles, earth moving equipment towed by earth moving vehicles, or any vehicle or object which is towed behind a towing vehicle.

While there is shown and described the present preferred embodiment of the invention, it is to be distinctly understood that this invention is not limited thereto but may be variously embodied to practice within the scope of the following claims.

I claim:

1. A terrain following hitch for attaching a towed vehicle to a draw bar of a towing vehicle, in which said draw bar has a pin hole which is used to attach said towed vehicle using a locking pin, and said draw bar is for pulling said towed vehicle, comprising:

a draw bar attachment tube with a closed end and a top side and a bottom side, and a pin hole in said top side and bottom side, in which said pin holes of said top side and said bottom sides of said draw bar attachment tube are configured to be in alignment with said pin hole of said draw bar when said draw bar is in contact with said closed end of said draw bar attachment tube;

an alignment tab attached to said draw bar attachment tube for aligning said terrain following hitch to said draw bar;

a first hinge with two hinge leaves and a hinge pin, which allows rotation of said implement within a first plane, and which is attached to said draw bar and to a second hinge;

a second hinge, with two second hinge leaves and a second hinge pin, which allows rotation of said towed vehicle within a second plane which is at a 90 degree to said first hinge, and which is attached to said first hinge and to a third hinge;

a third hinge with at least one third leaf and a third hinge pin, which allows rotation of said towed vehicle or object within a third plane which is at a 90 degree angle to said first plane and said second plane, and which is attached to said second hinge at said third hinge pin; wherein, said terrain following hitch allows said towed vehicle to rotate in three planes to a position conforming to a configuration of ground, and independently of a position of said towing vehicle, and said hitch allows one man attachment of said terrain following hitch to said towing vehicle, by positioning said towing vehicle in close proximity to said terrain following hitch, then by placing said alignment tab on said draw bar, and then by backing said towing vehicle until said draw bar contacts said closed end of said draw bar attachment tube, and then by inserting a pin through said pin hole in said top side and bottom side of said draw bar alignment tube and through said pin hole in said draw bar.

2. The terrain following hitch of claim 1 in which said towed vehicle is a farm implement.

3. The terrain following hitch of claim 1 in which said towing vehicle is a tractor.

4. The terrain following hitch of claim 1 in which said third hinge further comprises a tubular leaf attached to a leaf of said second hinge, and surrounds and is mounted on said third hinge pin, and a towed vehicle or object is attached to said third leaf; wherein, said tubular leaf of said third hinge allows said towed vehicle or object to rotate with said tubular leaf around said third hinge pin.

5. The terrain following hitch of claim 4 in which said draw bar attachment tube further comprises one or more bushings.

6. The terrain following hitch of claim 1 which further includes one or more lubrication fittings associated with one or more of said hinges.

7. A terrain following hitch for attaching a towed object to a draw bar of a towing vehicle, in which said draw bar includes a pin hole for attachment of towed objects, comprising:

a draw bar attachment tube with a closed end and a top side and a bottom side, and a pin hole in said top side and bottom side, in which said pin hole in said top side and said bottom sides of said draw bar attachment tube are configured to be in alignment when said pin hole of said draw bar when said draw bar is in contact with said closed end of said draw bar attachment tube;

an alignment tab attached to said draw bar attached tube for aligning said terrain following hitch to said draw bar;

a locking pin, for locking said draw bar attachment tube to said draw bar;

a first hinge with a static leaf, a rotating leaf, and a hinge pin, in which said static leaf is attached to said draw bar attachment tube and comprises one or more hinge pin holes, said rotating leaf has one or more hinge pin holes, in which said hinge pin extends through said hinge pin holes of said rotating leaf and said static leaf, and rotatably interconnects said static leaf with said rotating leaf, and when so interconnected allows a towed component to rotate in a first plane;

a second hinge with a second static leaf, a second rotating leaf, and a second hinge pin, in which said second static leaf is attached to said rotating leaf of said first hinge, and comprises one or more hinge pin holes, said second rotating leaf has one or more hinge pin holes and is attached to a spindle, and in which said second hinge pin extends through said hinge pin holes of said second rotating leaf and said second static leaf, and rotatably interconnects said second static leaf with said second rotating leaf, and when so interconnected allows a towed component to rotate in a second plane at 90 degree to said first plane;

a spindle, which is attached to said second rotating leaf of said second hinge, and on which is mounted a tool tube, to which an implement is attached; wherein said hitch allows one man attachment of said terrain following hitch to said towing vehicle, by positioning said towing vehicle in close proximity to said terrain following hitch, then by placing said alignment tab on said draw bar, and then by backing said towing vehicle until said draw bar contacts said closed end of said draw bar attachment tube, and then by inserting a pin through said pin hole in said top side and bottom side of said draw bar alignment tube and through said hole in said draw bar.

8. The terrain following hitch of claim 6 in which said first hinge is oriented vertically, and said second hinge is oriented horizontally, normal to a direction of travel said towing vehicle, and said spindle is oriented horizontally, parallel to said direction of travel of said towing vehicle.

9. The terrain following hitch of claim 6 in which said first hinge is oriented horizontally, normal to a direction of travel said towing vehicle, and said second hinge is oriented vertically, and said spindle is oriented horizontally, parallel to said direction of travel of said towing vehicle.

10. A terrain following hitch for attaching a towed object to a draw bar of a towing vehicle, in which said draw bar includes a pin hole for attachment of towed objects, comprising:

a receiver hitch insertion tube, with a closed end and a top side and a bottom side, and a pin hole in said top side and said bottom side, in which said pin hole in said top side and said bottom sides of said draw bar attachment tube are configured to be in alignment when said pin hole of said draw bar when said draw bar is in contact with said closed end of said draw bar attachment tube;

an alignment tab attached to said draw bar attachment tube for aligning said terrain following hitch to said draw bar;

a locking pin, for locking said receiver hitch insertion tube to said draw bar;

a first hinge with a static leaf, a rotating leaf, and a hinge pin, in which said static leaf is attached to said receiver hitch insertion tube and comprises one or more hinge pin holes, said rotating leaf has one or more hinge pin holes, in which said hinge pin extends through said hinge pin holes of said rotating leaf and said static leaf, and rotatably interconnects said static leaf with said rotating leaf, and when so interconnected allows a towed component to rotate in a first plane;

a second hinge with a second static leaf, a second rotating leaf, and a second hinge pin, in which said second static leaf is attached to said rotating leaf of said first hinge, and comprises one or more hinge pin holes, said second rotating leaf has one or more hinge pin holes and is attached to a spindle, and in which said second hinge pin extends through said hinge pin holes of said second rotating leaf and said second static leaf, and rotatably interconnects said second static leaf with said second rotating leaf, and when so interconnected allows a towed component to rotate in a second plane at 90 degree to said first plane;

a spindle, which is attached to said second rotating leaf of said second hinge, and on which is mounted a tool tube, to which an implement is attached, and on which a tube bolt nut is engaged; whereby said hitch allows one man attachment of said terrain following hitch to said towing vehicle, by positioning said towing vehicle in close proximity to said terrain following hitch, then by placing said alignment tab on said draw bar, and then by backing said towing vehicle until said draw bar contacts said closed end of said draw bar attachment tube, and then by inserting a pin through said pin hole in said top side and bottom side of said draw bar alignment tube and through said hole in said draw bar.

\* \* \* \* \*